United States Patent Office 3,268,533
Patented August 23, 1966

3,268,533
4-AMINOPHENYLCYCLOPROPYL KETONES
Meier E. Freed, Philadelphia, and Elisabeth Hertz, Bryn Mawr, Pa., assignors to American Home Products Corporation, New York, N.Y., a corporation of Delaware
No Drawing. Filed June 11, 1964, Ser. No. 374,281
13 Claims. (Cl. 260—268)

This invention relates to 4-aminophenylcyclopropyl ketones and to processes for making such compounds.

The compounds of this invention exert qualitatively varying therapeutic effects as evidenced by pharmacological evaluation in warm-blooded animals using standard test procedures. The compounds encompassed by the present invention have been found to have hypotensive, and central nervous system activities including antiparkinsonian, anticonvulsant and tranquilizing activities.

The pharmacologically useful compounds of the present invention are represented by the following formula:

(I)
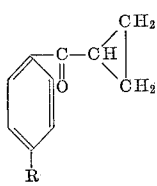

wherein R is selected from among the following basic moieties: (lower)alkylamino and di(lower)alkylamino having up to 6 carbon atoms therein; piperidino, morpholino, piperazino, methylpiperazino, phenylpiperazino, hydroxyethylpiperazino, and 4-ethoxycarbonyl-4-phenylpiperidino, and (cyclopropylcarbonyl)phenylpiperazino. These compounds are obtained by the synthetic procedures indicated below:

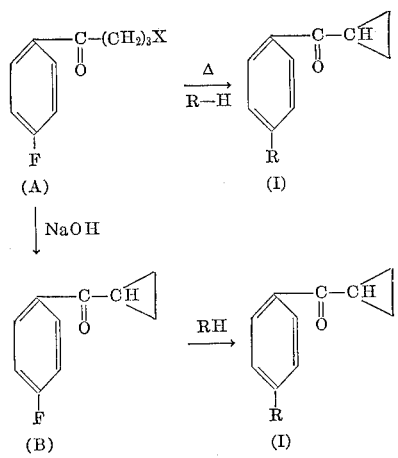

wherein X is chlorine or bromine.

As outlined above, the claimed compounds can be prepared by either starting with a known 4-halo-4'-fluorobutyrophenone (A) or with a known 4-fluorophenylcyclopropyl ketone (B) or by preforming the latter compound by treating the former with methanolic sodium hydroxide. The starting material (A or B) is reacted with an amine of the formula RH, where R is as previously defined. The reaction is carried out in a polar solvent such as dimethylsulfoxide, dimethylformamide, or acetonitrile, or in a non-polar high boiling hydrocarbon such as toluene or xylene. The polar solvents are preferred as they enable the reaction to be run at lower temperatures and result in higher yields than the non-polar solvents.

By using an acid scavenger such as potassium carbonate it is possible to use equimolar amounts of the reactants. In the absence of the acid scavenger, about two moles of amine should be used for each mole of the other reactant. The temperature range for the reaction is from room temperature to about 110° C. The time required to complete the reaction ranges from about 6 to about 48 hours, depending upon the particular reactants, the solvents and the temperature. Product recovery is effected by cooling the reaction mass and by adding water if a precipitate does not form upon cooling. The product may be purified by recrystallizing from ethanol, acetone, dimethylsulfoxide or cyclohexane.

The present invention is better illustrated by reference to the following examples. It is to be kept in mind that these examples are given only to show generally the processes leading to the new compounds and are not intended to limit the invention.

*Example 1.—Cyclopropyl p-(4-methylpiperazino)phenyl ketone*

A solution of 2.5 g. (0.015 mole) 4-fluorophenylcyclopropyl ketone and 6 g. of N-methylpiperazine (0.06 mole) in 5 ml. of dimethylsulfoxide was warmed on the steam bath for about 12 hours. On cooling the product separated as pale yellow crystals which were filtered from the solvent, dried and recrystallized from aqueous ethanol, M.P. 141–142°; yield: 2.95 g. (80%).

*Analysis.*—Calcd. for $C_{15}H_{20}N_2O$: C, 73.73; H, 8.25; N, 11.47. Found: C, 73.78; H, 8.37; N, 11.26.

(1a) The same quantities of 4-fluorophenylcyclopropyl ketone and N-methylpiperazine were dissolved in 50 ml. of dry xylene and heated under reflux for 48 hrs. The solution was cooled and extracted with 2 N hydrochloric acid. The aqueous acid was made alkaline with 20% sodium hydroxide and the crystalline product was separated by filtration. Recrystallized from aqueous ethanol, M.P. 141–142° C.; yield: 15%.

*Example 2.—p-(4-phenylpiperazino)phenylcyclopropyl ketone*

A solution of 5 g. (0.03 mole) of 4-fluorophenylcyclopropyl ketone and 9.7 g. (0.06 mole) of N-phenylpiperazine in 20 ml. of dimethylsulfoxide was heated for 18 hrs. at 90–95°. The solution was then cooled, poured into water (100 ml.) and the product, a yellow solid, was collected on a funnel, washed with water, dried. The product was recrystallized from acetone, M.P. 179–180°. Yield: 3.5 g. (37%).

*Analysis.*—Calcd. for $C_{20}H_{22}N_2$: C, 78.40; H, 7.24; N, 9.14. Found: C, 77.81; H, 7.05; N, 8.90.

*Example 3.—p-Dimethylaminophenylcyclopropyl ketone*

A solution of 4-fluorophenylcyclopropyl ketone (5 g., 0.03 mole) and dimethylamine (7.8 g., 0.06 mole) in 35 ml. of dimethylformamide was heated at 100–110° C. for 24 hrs. The solution was cooled and poured into 100 ml. of water. The precipitate was filtered from the solution, washed with water, and dried. After recrystallization from ethanol and again from acetone-pentane, the product melted at 138–140° C., yield: 2.5 g. (44%).

*Analysis.*—Calcd. for $C_{12}H_{15}NO$: C, 76.15; H, 7.99; N, 7.40. Found: C, 76.24; H, 8.11; N, 7.31.

*Example 4.—p-[4-(2-hydroxyethyl)piperazino]-phenylcyclopropyl ketone*

A mixture of N-2-hydroxyethylpiperazine (3.9 g.; 0.03 mole), 4-fluorophenylcyclopropyl ketone (4.9 g., 0.03 mole), and anhydrous potassium carbonate (2.1 g.) in 10 ml. of dimethylsulfoxide was heated on the steam bath for 6 hours. The reaction mixture was cooled, diluted with water (50 ml.), and the precipitated product collected by filtration. The precipitate was washed with water and dried. Recrystallization from cyclohexane gave product melting at 119–120° C.; yield: 44.6%.

Analysis.—Calcd. for $C_{16}H_{22}N_2O_2$: C, 70.04; H, 8.08; N, 10.21. Found: C, 69.89; H, 8.15; N, 10.25.

*Example 5.—p-Piperidinophenylcyclopropyl ketone*

A solution of 4-fluorophenylcyclopropyl ketone (8.2 g., .05 mole) and piperidine (8.5 g., 0.1 mole) in 15 ml. of dimethylsulfoxide was heated on the steam bath for 6½ hrs. The reaction mixture was cooled and the precipitate was collected by filtration. The precipitate was washed with water and dried over $P_2O_5$ in vacuo; M.P. 100.5–103° C.; yield: 88.5%.

Analysis.—Calcd. for $C_{15}H_{19}NO$: C, 78.55; H, 8.35; N, 6.11. Found: C, 78.58; H, 8.22; N, 6.06.

*Example 6.—p-Morpholinophenylcyclopropyl ketone*

In the manner described for Example 5, 4-fluorophenylcyclopropyl ketone (0.05 mole) and morpholine (0.1 mole) are heated in dimethylsulfoxide to afford the 4-morpholino derivative.

*Example 7.—p-Piperazinophenylcyclopropyl ketone*

A mixture of piperazine (17.2, 0.2 mole), 4-fluorophenylcyclopropyl ketone (16.4, 0.1 mole), and anhydrous potassium carbonate (27.6 g.) in 50 ml. of dimethylsulfoxide was heated at 90–95° C. for 7 hrs. The reaction mixture was cooled, diluted with water (200 ml.) and filtered. The precipitate was washed with water, dried, and recrystallized from dimethylsulfoxide; M.P. 147–9° C.; yield: 56.7%.

Analysis.—Calcd. for $C_{14}H_{18}N_2O$: C, 73.01; H, 7.88; N, 12.17. Found: C, 73.17; H, 8.12; N, 12.41.

*Example 8.—1,4-bis(p-cyclopropylcarbonylphenyl) piperazine*

A mixture of 4-(piperazino)phenylcyclopropyl ketone (11 g., 0.048 mole), 4-fluorophenylcyclopropyl ketone (8.2 g., 0.05) and anhydrous potassium carbonate (14 g.) in 25 ml. of dimethylsulfoxide was heated on the steam bath for 22 hrs. After cooling the mixture was diluted with water and filtered. The product was washed and dried. After recrystallization from dimethyl sulfoxide it melted at 241.3° C.; yield: 43.8%.

Analysis.—Calcd. for $C_{24}H_{26}N_2O_2$: C, 76.97; H, 7.00; N, 7.48. Found: C, 76.77; H, 6.69; N, 7.56.

*Example 9.—p-Ethylaminophenylcyclopropyl ketone*

A solution of ethylamine (2.25 g., 0.05 mole) in 10 g. dimethylsulfoxide was placed in a pressure bottle together with 4-chloro-4'-fluorobutyrophenone (10 g., 0.05 mole), potassium carbonate (13.8 g., 0.1 mole) and 15 ml. of dimethylsulfoxide was added. The sealed bottle was heated at 90–95° for 18 hrs. After cooling, the contents were poured into 300 ml. cold water, the organic layer extracted into ether. The extract was water washed and dried over sodium sulfate. The ether was removed and the residue crystallized twice from cyclohexane yielding the product (1.2 g., 12%) melting at 129–134° C. An analytical sample was obtained by recrystallization from dimethyl sulfoxile; M.P. 136–138° C.

Analysis.—Calcd. for $C_{12}H_{15}NO$: C, 76.15; H, 7.99; N, 7.40. Found: C, 76.28; H, 8.18; N, 7.56.

*Example 10.—Ethyl 4-phenyl-1-(p-cyclopropylcarbonylphenyl)isonipecotate*

A mixture of ethyl 4-phenylisonipecotate hydrochloride (13.5 g., 0.05 mole), 4-fluorophenylcyclopropyl ketone (8.2 g., 0.05 mole), and anhydrous potassium carbonate (13.8 g.) in 30 ml. of dimethylsulfoxide was heated for 18 hrs. at 90–95° C. The reaction mixture was cooled and the product filtered off. The product was recrystallized from dimethlsulfoxide and dried, M.P. 128–29° C.; yield: 41%.

Analysis.—Calcd. for $C_{24}H_{27}NO_3$: C, 76.36; H, 7.21; N, 3.71. Found: C, 75.88; H, 7.01; N, 3.87.

*Example 11.—p-Dipropylaminophenylcyclopropyl ketone*

Following the procedure of Example 3, but using n-dipropylamine instead of dimethylamine, p-dipropylaminophenylcyclopropyl ketone is prepared.

The compounds of this invention can be administered with pharmaceutically acceptable inert carriers in a wide variety of oral or parenteral unit dosage forms containing 25, 100, 250 or 500 mg. of active ingredients for the symptomatic adjustment of the dosage, or in admixture with other active compounds.

The present invention also includes the process of bringing the compounds thereof into a form suitable for therapeutic administration by associating them with liquid or solid, pharmaceutically acceptable carriers.

What is claimed is:

1. A compound of the formula:

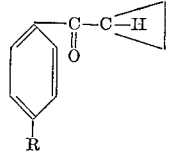

wherein R is selected from the group consisting of: (lower)alkylamino, di(lower)alkylamino, piperidino, morpholino, piperazino, methylpiperazino, phenylpiperazino, hydroxyethylpiperazino, and (cyclopropylcarbonyl) phenyl piperazino.

2. Cyclopropyl p-(4-lower alkylpiperazino)phenyl ketone.
3. p-Di(lower)alkylaminophenylcyclopropyl ketone.
4. p-[4-(2 - hydroxy - lower - alkyl)piperazino]phenylcyclopropyl ketone.
5. p-(Lower)alkylaminophenylcyclopropyl ketone.
6. Cyclopropyl p-(4-methylpiperazino)phenyl ketone.
7. p-(4-phenylpiperazino)phenylcyclopropyl ketone.
8. p-Dimethylaminophenylcyclopropyl ketone.
9. p-[4-(2-hydroxyethyl)piperazino]phenylcyclopropyl ketone.
10. p-Piperidinophenylcyclopropyl ketone.
11. p-Piperazinophenylcyclopropyl ketone.
12. 1,4-bis(p-cyclopropylcarbonylphenyl)piperazine.
13. p-Ethylaminophenylcyclopropyl ketone.

No references cited.

ALEX MAZEL, *Primary Examiner.*

JAMES W. ADAMS, *Assistant Examiner.*